United States Patent
Bruno

(10) Patent No.: US 11,104,442 B2
(45) Date of Patent: Aug. 31, 2021

(54) SHOESTRING ENVIRONMENTAL CONTROL SYSTEM FOR AN AIRCRAFT

(71) Applicant: Hamilton Sundstrand Corporation, Charlotte, NC (US)

(72) Inventor: Louis J. Bruno, Ellington, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 154 days.

(21) Appl. No.: 16/358,267

(22) Filed: Mar. 19, 2019

(65) Prior Publication Data

US 2020/0298980 A1  Sep. 24, 2020

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0662* (2013.01); *B64D 2013/0688* (2013.01)

(58) Field of Classification Search
CPC ............ B64D 13/06; B64D 2013/0618; B64D 2013/0648; B64D 2013/0662; B64D 13/02; B64D 2013/0611
USPC .......................................................... 62/116
See application file for complete search history.

(56) References Cited

U.S. PATENT DOCUMENTS

| | | | |
|---|---|---|---|
| 4,021,215 A * | 5/1977 | Rosenbush | B64D 13/06 62/402 |
| 4,261,416 A | 4/1981 | Hamamoto | |
| 5,299,763 A | 4/1994 | Bescoby et al. | |
| 5,461,882 A | 10/1995 | Zywiak | |
| 9,669,936 B1 | 6/2017 | Fiterman et al. | |
| 9,878,794 B2 | 1/2018 | Bruno | |
| 10,144,517 B2 | 12/2018 | Bruno et al. | |
| 2017/0341759 A1 | 11/2017 | Bruno et al. | |
| 2017/0341760 A1 | 11/2017 | Hall et al. | |
| 2017/0341764 A1 | 11/2017 | Bruno et al. | |
| 2017/0342838 A1* | 11/2017 | Bruno | F04D 17/025 |
| 2018/0215474 A1 | 8/2018 | Defrancesco et al. | |

FOREIGN PATENT DOCUMENTS

| | | |
|---|---|---|
| EP | 1112930 A2 | 7/2001 |
| EP | 1386837 A1 | 2/2004 |
| EP | 3354576 A1 | 8/2018 |

OTHER PUBLICATIONS

Extended European Search Report; International Application No. 19210078.2-1010; International Filing Date: Nov. 19, 2019; dated Jun. 23, 2020; 12 pages.

* cited by examiner

*Primary Examiner* — Steve S Tanenbaum
(74) *Attorney, Agent, or Firm* — Cantor Colburn LLP

(57) ABSTRACT

An environmental control system of an aircraft includes a compressing device having a compressor configured to receive a flow of a first medium and a turbine configured to receive the flow of the first medium from the compressor and a flow of a second medium. The turbine is arranged downstream from the compressor along a flow path of the first medium. A dehumidification system is arranged in fluid communication with the turbine and a bypass valve is operable configured to divert the flow of the first medium around the turbine and at least a portion of the dehumidification system.

14 Claims, 2 Drawing Sheets

SHOESTRING ENVIRONMENTAL CONTROL SYSTEM FOR AN AIRCRAFT

BACKGROUND

Embodiments of the disclosure relate to environmental control systems, and more specifically to an environmental control system of an aircraft.

Today's air condition systems are supplied pressure that is approximately 30 psig to 35 psig. The energy in the bleed air, in the form of pressure, has is typically applied to either ram air via the ACM fan, the bleed air via the ACM compressor, or to both. A new approach applies the energy in the bleed to the recirculation air.

BRIEF DESCRIPTION

According to one or more embodiments, an environmental control system of an aircraft includes a compressing device having a compressor configured to receive a flow of a first medium and a turbine configured to receive the flow of the first medium from the compressor and a flow of a second medium. The turbine is arranged downstream from the compressor along a flow path of the first medium. A dehumidification system is arranged in fluid communication with the turbine and a bypass valve is operable configured to divert the flow of the first medium around the turbine.

In addition to one or more of the features described above, or as an alternative, in further embodiments the turbine has a first inlet and a second inlet, the flow of the first medium being arranged in fluid communication with one of the first inlet and the second inlet, and the flow of the second medium being arranged in fluid communication with the other of the first inlet and the second inlet.

In addition to one or more of the features described above, or as an alternative, in further embodiments the flow of the first medium mixes with the flow of the second medium at an exit of the turbine.

In addition to one or more of the features described above, or as an alternative, in further embodiments the dehumidification system is positioned upstream from the second inlet of the turbine.

In addition to one or more of the features described above, or as an alternative, in further embodiments the first medium is cabin recirculation air.

In addition to one or more of the features described above, or as an alternative, in further embodiments the second medium is bleed air.

In addition to one or more of the features described above, or as an alternative, in further embodiments the bleed air is drawn from at least one of an engine and an auxiliary power unit of the aircraft.

In addition to one or more of the features described above, or as an alternative, in further embodiments the environmental control system is operable in a plurality of modes including a first mode and a second mode.

In addition to one or more of the features described above, or as an alternative, in further embodiments the environmental control system is operable in the first mode when an ambient temperature is at or above a design point of the environmental control system.

In addition to one or more of the features described above, or as an alternative, in further embodiments the environmental control system is operable in the second mode when an ambient temperature is below a design point of the environmental control system.

In addition to one or more of the features described above, or as an alternative, in further embodiments the valve is in a closed position during operation in the first mode and the valve is in an open position during operation in the second mode.

In addition to one or more of the features described above, or as an alternative, in further embodiments a mixture of the flow of the first medium and the flow of the second medium is provided to a load, and the valve is operable to control a temperature of the mixture of the flow of the first medium and the flow of the second medium provided to the load.

In addition to one or more of the features described above, or as an alternative, in further embodiments comprising a ram air circuit including a ram air shell having at least one heat exchanger positioned therein.

In addition to one or more of the features described above, or as an alternative, in further embodiments the compressing device includes a fan operably coupled to the compressor and the turbine via a shaft, the fan being arranged in fluid communication with the ram air circuit.

In addition to one or more of the features described above, or as an alternative, in further embodiments the at least one heat exchanger includes a first heat exchanger and a second heat exchanger.

According to another embodiment, a method of operating an environmental control system of an aircraft includes providing a first medium to the environmental control system including a compressor and a turbine. The first medium is provided to the compressor and the turbine sequentially. A second medium is provided to the environmental control system. In a first mode of operation, the first medium and the second medium mix within the turbine and in a second mode of operation the second medium bypasses the turbine such that the first medium and the second medium mix downstream from the turbine.

In addition to one or more of the features described above, or as an alternative, in further embodiments the environmental control system is transformed from the first mode of operation to the second mode of operation by opening a bypass valve.

In addition to one or more of the features described above, or as an alternative, in further embodiments a temperature of the mixture of the first medium and the second medium generated in the first mode of operation is cooler than a temperature of the mixture of the first medium and the second medium generated in the second mode of operation.

In addition to one or more of the features described above, or as an alternative, in further embodiments providing the first medium to the environmental control system includes drawing bleed air from an engine of the aircraft.

In addition to one or more of the features described above, or as an alternative, in further embodiments providing the first medium to the environmental control system includes drawing recirculation air from a cabin of the aircraft.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses energy from one or more of the different sources to power the environmental control system and to provide both cabin pressurization and cooling. The mediums described herein are generally types of air; however, it should be understood that other mediums, such as gases, liquids, fluidized solids, or slurries are also contemplated herein.

Figure 1:
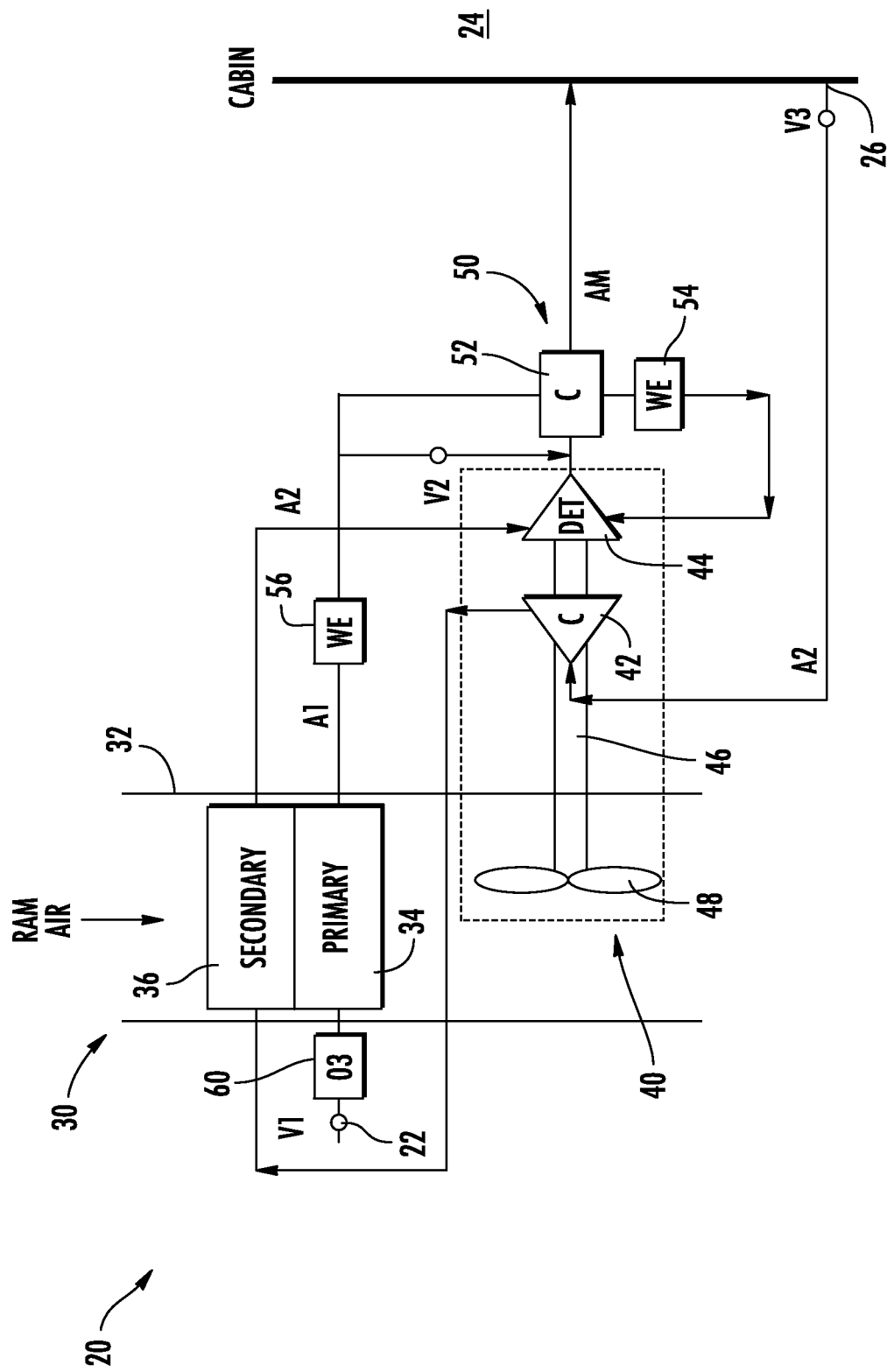
FIG. 1 is a simplified schematic of a portion of an environmental control system according to one embodiment.

With reference now to FIG. 1, a schematic diagram of a first configuration of an environment control system (also referred to as "ECS") 20 is depicted according to a non-limiting embodiment. Although the environmental control system 20 is described with reference to an aircraft, alternative applications are also within the scope of the disclosure. As shown in the FIG. 1, the environmental control system 20 can receive a first medium A1 at the inlet 22 and provide a conditioned form of the first medium A1 to a volume 24. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The environmental control system 20 receives a second medium A2 at an inlet 26. In one embodiment, the volume 24 is the cabin of an aircraft, and the second medium A2 is cabin recirculation air, which is air leaving the volume 24 that would typically be recirculated using an electrical fan.

The environmental control system 20 includes a RAM air circuit 30 including a shell or duct, illustrated schematically at 32, within which one or more heat exchangers are located. The shell 32 can receive and direct a medium, such as ram air for example, through a portion of the environmental control system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first heat exchanger 34 and a second heat exchanger 36. Within the heat exchangers 34, 36 ram air, such as outside air drawn in through a scoop for example, acts as a heat sink to cool a medium passing there through, for example the first medium A1 and/or the second medium A2.

The environmental control system 20 additionally comprises at least one compressing device 40. In the illustrated, non-limiting embodiment, the compressing device 40 of the environmental control system 20 is a mechanical device that includes components for performing thermodynamic work on a medium (e.g., extracts work from or applies work to the first medium A1 and/or the second medium A2 by raising and/or lowering pressure and by raising and/or lowering temperature). Examples of the compressing device 40 include an air cycle machine, a three-wheel air cycle machine, a four-wheel air cycle machine, etc.

As shown, the compressing device 40 includes a compressor 42 and a turbine 44 operably coupled to each other via a shaft 46. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The turbine 44 is a mechanical device that expands a medium and extracts work therefrom (also referred to as extracting energy). In the illustrated, non-limiting embodiment, the turbine 44 includes a plurality of inlet fluid flow paths, such as an inner flow path and an outer flow path, to enable mixing of multiple medium flows at the exit of the turbine 44. The inner flow path can be a first diameter, and the outer flow path can be a second diameter. In the compressing device 40, the turbine 44 drives the compressor 42 via the shaft 46. The fan 48 is a mechanical device that can force, via push or pull methods, a medium (e.g., ram air) through the shell 32 across the one or more ram heat exchangers 34, 36 and at a variable cooling to control temperatures.

The environmental control system 20 additionally includes at least one dehumidification system 50. In the illustrated, non-limiting embodiment, the dehumidification system 50 includes a condenser 52 and a water collector 54. The condenser 52 is a particular type of heat exchanger and the water collector 54 is a mechanical device that performs a process of removing water from a medium. The condenser 52 and the water collector 54 are arranged in fluid communication with the first medium A1, and in some embodiments, with both the first medium A1 and the second medium A2. The configuration of the at least one dehumidification system 50 may vary. In an embodiment, the dehumidification system 50 includes an additional water extractor 56 associated with the first medium A1 and located at a position upstream from the condenser 52.

The elements of the environmental control system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value. For instance, a first valve V1 is configured to control a supply of the first medium A1 provided to the system 20. A second valve V2, also referred to herein as a bypass valve, may be operable to allow a portion of a medium, such as the first medium A1, to bypass the turbine 44 of the compression device 40. As a result, operation of the bypass valve V2 may be used to add heat and to drive the compression device 40 during failure modes. A third valve V3 is similarly operable to control a supply of the second medium A2 provided to the system.

The environmental control system of FIG. 1 may be operable in a plurality of modes based on a flight condition of the aircraft. For example, the environmental control system 20 may be operable in a first mode when the ambient temperature is at or above a selected design point of the system 20. In the first mode of operation, valve V1 is opened to draw a high pressure, high temperature first medium, such as bleed air, from a bleed source. Examples of suitable sources of bleed air include, but are not limited to, an engine of the aircraft or an auxiliary power unit for example. The first medium provided through the inlet 22 passes through an ozone converter, illustrated at 60, before being provided to the first heat exchanger 34. Within the first heat exchanger 34, the first medium A1 is cooled via a flow of ram air. Embodiments where other components, such as an outflow heat exchanger (not shown) for example, is positioned directly downstream from or upstream from the first heat exchanger 34 are also within the scope of the disclosure.

The first medium is then provided to at least a portion of the dehumidification system 50. As shown, the first medium A1 output from the first heat exchanger 34 is provided to the water extractor 56 where moisture is then removed from the first medium A1. Instead of providing the dry first medium from the water extractor 56 directly to the turbine 44, the first medium within the environmental control system is provided to the condenser 52 and water collector 54 of the dehumidification system 50 where the any free moisture is condensed and removed, to produce cool high-pressure air. This cool, high pressure first medium A1 then enters the turbine 44 through a second inlet or nozzle (e.g., a second nozzle).

The cool, high pressure first medium A1 is expanded across the turbine 44 and work is extracted therefrom. This extracted work drives the compressor 42 used to compress a second medium A2, such as cabin recirculation air. This extracted work also drives the fan 48, which is used to move air through the ram air circuit 30, and more specifically over the first heat exchanger 34 and second heat exchangers 36 (also known as ram air heat exchangers).

The act of compressing the second medium A2, heats the second medium A2. The compressed second medium A2 enters the second heat exchanger 36 where it is cooled by ram air. In an embodiment, the second heat exchanger is located upstream from the first heat exchanger relative to a flow of ram air through the shell 32 of the ram air circuit 30. The second medium A2 exiting the second heat exchanger 36 is then provided to the turbine 44 through a first inlet or nozzle (e.g., a first nozzle). The cool medium pressure second medium A2 is expanded across the turbine 44 and work extracted from the cool medium pressure air.

The two air flows (e.g., the cabin recirculation air A2 sourced from inlet 26 and the bleed air A1 sourced from inlet 22) are mixed at an exit of the turbine 44 to produce a mixed air AM. The exit of the turbine 44 can be considered a first mixing point of the environmental control system 20. The mixed air AM leaves the turbine 44 and enters the condenser 52 to cool the first medium A1 leaving the first heat exchanger 34. The mixed medium A1+A2 is then sent to one or more downstream loads and/or locations of the aircraft, such as to condition the volume 24.

The second mode of the environmental control system 20 is associated with operation of the system at ambient temperatures below a selected design point of the environmental control system. In the second mode of operation, the bypass valve V2 is open, thereby allowing a portion of the first medium A1 output from the water extractor 56 to bypass the turbine 44. In such embodiments, the first medium A1 is mixed with the second medium A2 downstream from an outlet of the turbine 44, before being provided to the condenser 52.

Figure 2:
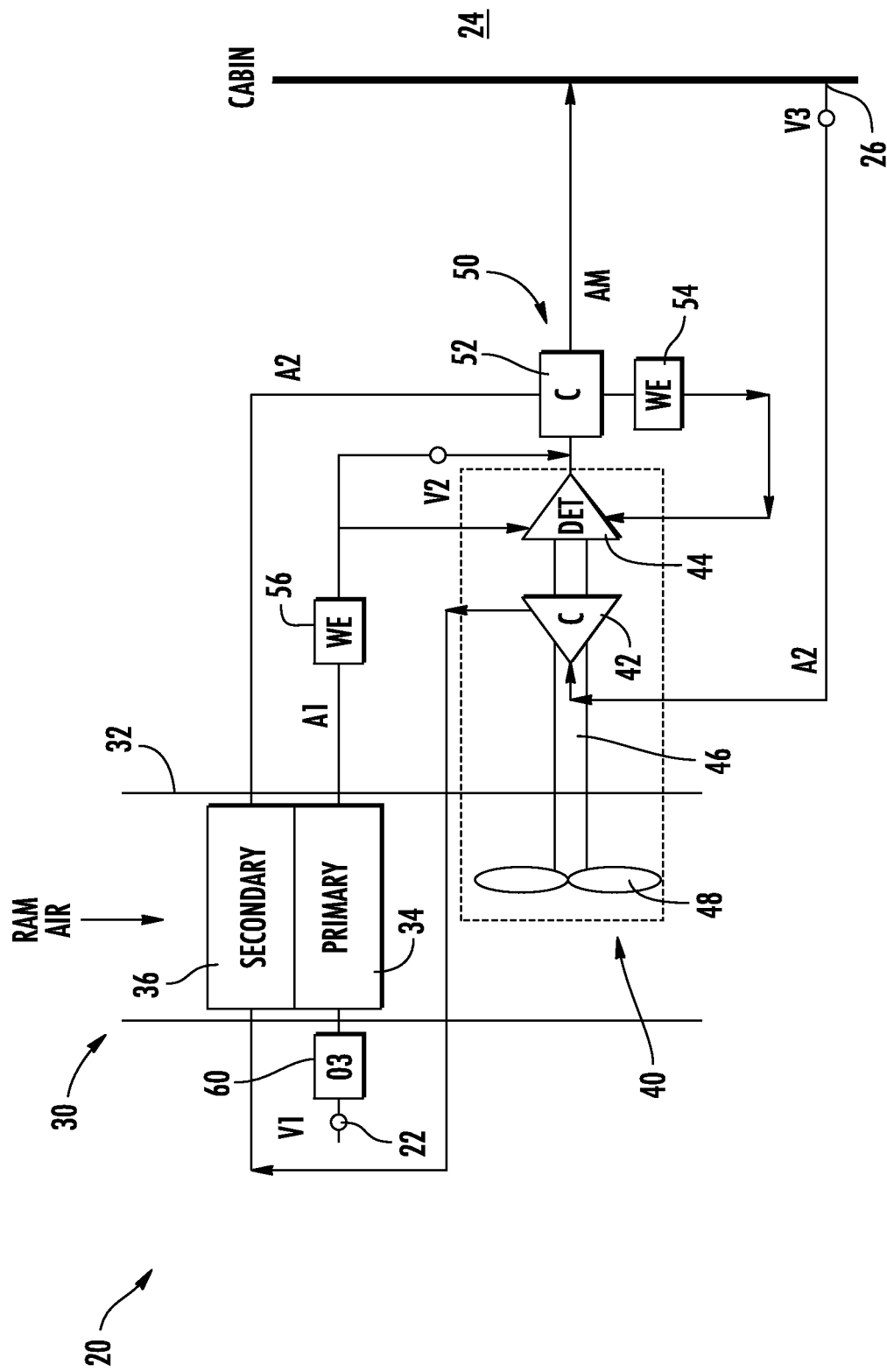
FIG. 2 is a simplified schematic of a portion of an environmental system according to another embodiment.

With reference now to FIG. 2, another configuration of the environmental control system 20 is illustrated. Although the configuration is similar to the configuration of FIG. 1, in the illustrated embodiment, the condenser 52 and the water collector 54 of the dehumidification system 50 are arranged downstream from an outlet of the second heat exchanger 36 rather than the outlet of the first heat exchanger 34.

The second configuration of the environmental control system of FIG. 2 is similarly operable in both a first and second mode. In the first mode of operation, valve V1 is opened to draw a high pressure, high temperature first medium, such as bleed air, from a bleed source. Examples of suitable sources of bleed air include, but are not limited to, an engine of the aircraft or an auxiliary power unit for example. The first medium provided through the inlet 22 passes through an ozone converter, illustrated at 60, before being provided to the first heat exchanger 34. Within the first heat exchanger 34, the first medium A1 is cooled via a flow of ram air. Embodiments where other components, such as an outflow heat exchanger (not shown) for example, is positioned directly downstream from or upstream from the first heat exchanger 34 are also within the scope of the disclosure.

As shown, the first medium A1 output from the first heat exchanger 34 is provided to the water extractor 56 where moisture is removed from the first medium A1. This cool, dry, high pressure first medium A1 then enters the turbine 44 through a first inlet or nozzle (e.g., a first nozzle).

The cool, high pressure first medium A1 is expanded across the turbine 44 and work is extracted therefrom. This extracted work drives the compressor 42 used to compress a second medium A2, such as cabin recirculation air. This extracted work also drives the fan 48, which is used to move air through the ram air circuit 30, and more specifically over the first heat exchanger 34 and second heat exchangers 36 (also known as ram air heat exchangers).

The act of compressing the second medium A2, heats the second medium A2. The compressed second medium A2 enters the second heat exchanger 36 where it is cooled by ram air. In an embodiment, the second heat exchanger is located upstream from the first heat exchanger relative to a flow of ram air through the shell 32 of the ram air circuit 30. The second medium A2 exiting the second heat exchanger 36 is then provided to the condenser 52 and water extractor 56 of the dehumidification system 50 where any free moisture is removed, to produce cool medium pressure air. From the dehumidification system 52, the cool, medium pressure second medium A2 is provided to the turbine 44 through a second inlet or nozzle (e.g., a second nozzle). The cool, medium pressure, second medium A2 is expanded across the turbine 44 and work is extracted from the cool medium pressure air.

The two air flows (e.g., the cabin recirculation air A2 sourced from inlet 26 and the bleed air A1 sourced from inlet 22) are mixed at an exit of the turbine 44 to produce a mixed air AM. The exit of the turbine 44 can be considered a first mixing point of the environmental control system 20. The mixed air AM leaves the turbine 44 and enters the condenser 52 to cool the second medium A2 leaving the second heat exchanger 36. The mixed medium AM is then sent to one or more loads or locations of the aircraft, such as to condition the volume 24.

With continued reference to FIG. 2, in the second mode associated operation of the system at temperatures below the design point, the amount of first medium A1 needed to drive the compressor 42 can be reduced. In the second mode of operation, the bypass valve V2 may be open, thereby allowing a portion of the first medium output from the water extractor 56 to bypass the turbine 44. In such embodiments, the first medium A1 is mixed with the second medium A2 downstream from an outlet of the turbine 44, and upstream from the condenser 52.

Aspects of the embodiments are described herein with reference to flowchart illustrations, schematics, and/or block diagrams of methods, apparatus, and/or systems according to embodiments. Further, the descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of an aircraft comprising:
    a compressing device including a turbine configured to receive a flow of a first medium and a flow of a second medium and a compressor configured to receive the flow of the second medium, the turbine being arranged downstream from the compressor along a flow path of the second medium;
    a dehumidification system in fluid communication with the turbine, the dehumidification system being arranged upstream from the turbine along a flow path of the first medium; and
    a bypass valve selectively operable to divert the flow of the first medium around the dehumidification system and the turbine.

2. The environmental control system of claim 1, wherein the turbine has a first inlet and a second inlet, the flow of the first medium being arranged in fluid communication with one of the first inlet and the second inlet, and the flow of the second medium being arranged in fluid communication with the other of the first inlet and the second inlet.

3. The environmental control system of claim 2, wherein the flow of the first medium mixes with the flow of the second medium at an exit of the turbine.

4. The environmental control system of claim 1, wherein the first medium is bleed air.

5. The environmental control system of claim 1, wherein the second medium is cabin recirculation air.

6. The environmental control system of claim 4, wherein the bleed air is drawn from at least one of an engine and an auxiliary power unit of the aircraft.

7. The environmental control system of claim 1, wherein the environmental control system is operable in a plurality of modes including a first mode and a second mode.

8. The environmental control system of claim 7, wherein the environmental control system is operable in the first mode when an ambient temperature is at or above a design point of the environmental control system.

9. The environmental control system of claim 7, wherein the environmental control system is operable in the second mode when an ambient temperature is below a design point of the environmental control system.

10. The environmental control system of claim 7, wherein the bypass valve is in a closed position during operation in the first mode and the bypass valve is in an open position during operation in the second mode.

11. The environmental control system of claim 1, wherein a mixture of the flow of the first medium and the flow of the second medium is provided to a load, and the bypass valve is operable to control a temperature of the mixture of the flow of the first medium and the flow of the second medium provided to the load.

12. The environmental control system of claim 1, further comprising a ram air circuit including a ram air shell having at least one heat exchanger positioned therein.

13. The environmental control system of claim 12, wherein the compressing device includes a fan operably coupled to the compressor and the turbine via a shaft, the fan being arranged in fluid communication with the ram air circuit.

14. The environmental control system of claim 12, wherein the at least one heat exchanger includes a first heat exchanger and a second heat exchanger.

* * * * *